United States Patent [19]
Poon et al.

[11] Patent Number: 5,995,383
[45] Date of Patent: Nov. 30, 1999

[54] LOW COST AC-TO-DC CONVERTER HAVING INPUT CURRENT WITH REDUCED HARMONICS

[75] Inventors: Franki Ngai Kit Poon, Kowloon; Robert Chun Fung Lee, Causeway Bay, both of The Hong Kong Special Administrative Region of the People's Republic of China; Fu-Sheng Tsai, Northboro, Mass.; Francis Man Shuen Ho, Sheung Shui, N.T., The Hong Kong Special Administrative Region of the People's Republic of China

[73] Assignee: Computer Products, Inc., Fremont, Calif.

[21] Appl. No.: 08/721,497

[22] Filed: Sep. 27, 1996

Related U.S. Application Data

[63] Continuation-in-part of application No. 08/588,054, Jan. 19, 1996, Pat. No. 5,652,700, which is a continuation of application No. 08/543,561, Oct. 16, 1995, Pat. No. 5,600,546.

[51] Int. Cl.⁶ .................................................. H02M 3/335
[52] U.S. Cl. .............................................. 363/21; 363/89
[58] Field of Search ................................ 363/17, 20, 21, 363/40, 78, 89, 95, 98, 97, 131, 132

[56] References Cited

U.S. PATENT DOCUMENTS

| 4,412,277 | 10/1983 | Mitchell | 363/81 |
| 4,437,146 | 3/1984 | Carpenter | 363/21 |

(List continued on next page.)

FOREIGN PATENT DOCUMENTS

| 40 08 652 | 9/1991 | Germany | H02M 3/28 |

OTHER PUBLICATIONS

M. M. Jovanovic', et al., "Reduction of Voltage Stress in Integrated High–Quality Rectifier–Regulators by Variable–Frequency Control", Switching Rectifiers for Power Factor Correction, vol. V of the VPEC Publication Series, pp. 145–151, (1994).

Richard Redl and Laszlo Balogh, 1995 IEEE, "Design Considerations for Single–Stage Isolated Power–Factor–Corrected Power Supplies with Fast Regulation of the Output Voltage," pp. 454–458 (1995).

Odd Roar Schmidt, 1994 IEEE, "Quasi Resonant AC/DC Forward Converter With Sinusoidal Input Current," pp. 339–344 (1994).

TDK, Application Note, "*Current Control High Voltage Source*," 2 pages (1996).

International Electrotechnical Commission 1000–3–2, "*Standard, Electromagnetic Compatibility*", odd pp. 1–27, (1995).

G. Hua et al., "Novel Zero–Current–Transition PWM Converters", Virginia Polytechnic Institute and State University, Blacksburg, VA 24061, 6 pp.

L. Yang et al., "Analysis and Design of Boost Zero–Voltage–Transition PWM Converter", IEEE 0–7803–0982–0/93, pp. 707–713, (1993).

Ionel Dan Jitaru, "Soft Transitions Power Factor Correction Circuit", HFPC, Proceedings, pp. 202–208, May (1993).

*Primary Examiner*—Adolf Deneke Berhane
*Attorney, Agent, or Firm*—Skjerven, Morrill, MacPherson; Franklin and Friel; Michael J. Halbert

[57] ABSTRACT

An AC-to-DC power converter draws input current through an inductor. When the input voltage of the converter is sufficiently high and the switch of the converter is on, current flows into the converter, through the inductor, to the tap of a transformer, through a first primary winding of the transformer, and through the switch. When the switch is then turned off, current continues to flow through the inductor and to the tap of the transformer but then flows through a second primary of the transformer and into a storage capacitor. Energy stored in the storage capacitor is transferred to the load when it is not possible to obtain sufficient energy from the input current to supply the load. The AC-to-DC converter has very few circuit components and low input current harmonics.

18 Claims, 7 Drawing Sheets

U.S. PATENT DOCUMENTS

| | | | |
|---|---|---|---|
| 4,677,366 | 6/1987 | Wilkinson et al. | 323/222 |
| 4,853,837 | 8/1989 | Gulczynski | 363/80 |
| 4,940,929 | 7/1990 | Williams | 323/222 |
| 4,974,141 | 11/1990 | Serverinsky et al. | 363/81 |
| 5,066,900 | 11/1991 | Bassett | 323/224 |
| 5,067,066 | 11/1991 | Chida | 363/16 |
| 5,088,019 | 2/1992 | Williams et al. | 363/69 |
| 5,097,196 | 3/1992 | Schoneman | 323/222 |
| 5,126,931 | 6/1992 | Jitaru | 363/21 |
| 5,134,355 | 7/1992 | Hastings | 323/211 |
| 5,168,436 | 12/1992 | Barlage | 363/21 |
| 5,173,846 | 12/1992 | Smith | 363/20 |
| 5,180,964 | 1/1993 | Ewing | 323/222 |
| 5,206,800 | 4/1993 | Smith | 363/21 |
| 5,224,025 | 6/1993 | Divan et al. | 363/16 |
| 5,227,941 | 7/1993 | Rubin | 361/18 |
| 5,231,563 | 7/1993 | Jitaru | 363/98 |
| 5,262,930 | 11/1993 | Hua et al. | 363/21 |
| 5,264,780 | 11/1993 | Bruer et al. | 323/222 |
| 5,301,095 | 4/1994 | Teramoto et al. | 363/21 |
| 5,327,333 | 7/1994 | Boylan et al. | 363/21 |
| 5,331,534 | 7/1994 | Suzuki et al. | 363/20 |
| 5,343,378 | 8/1994 | Tohya | 363/21 |
| 5,349,514 | 9/1994 | Ushiki et al. | 363/21 |
| 5,442,539 | 8/1995 | Cuk et al. | 363/89 |
| 5,446,366 | 8/1995 | Bassett et al. | 323/222 |
| 5,448,465 | 9/1995 | Yoshida et al. | 363/15 |
| 5,515,257 | 5/1996 | Ishii | 363/21 |
| 5,581,451 | 12/1996 | Ochiai | 363/21 |
| 5,600,546 | 2/1997 | Ho et al. | 363/21 |
| 5,652,700 | 7/1997 | Tsai et al. | 363/21 |
| 5,673,184 | 9/1997 | Rilly et al. | 363/2 |
| 5,751,561 | 5/1998 | Ho et al. | 363/21 |

5,995,383

LOW COST AC-TO-DC CONVERTER HAVING INPUT CURRENT WITH REDUCED HARMONICS

CROSS-REFERENCE TO RELATED APPLICATIONS

This application is a continuation-in-part of U.S. application Ser. No. 08/588,054, filed Jan. 19, 1996, now U.S. Pat. No. 5,652,700 entitled "Low Cost AC-To-DC Converter Having Input Current With Reduced Harmonics," by Fancis Man Shuen Ho and Robert Chun Fung Lee, which is a continuation of U.S. application Ser. No. 08/543,561, filed Oct. 16, 1995, now U.S. Pat. No. 5,600,546, entitled "Input Harmonic Current Corrected AC-To-DC Converter With Multiple Coupled Primary Windings," by Francis Man Shuen Ho and Robert Chun Fung Lee, both of which are assigned to Computer Products, Inc., both of which are herein incorporated by reference.

FIELD OF THE INVENTION

This invention relates to AC-to-DC converters.

BACKGROUND INFORMATION

"Power factor correction" (PFC) techniques are used to realize AC-to-DC power converters which draw input currents having low harmonic content. For additional background, see the patent application entitled "LOW COST AC-TO-DC CONVERTER HAVING INPUT CURRENT WITH REDUCED HARMONICS", U.S. Ser. No. 08/543, 561, filed Oct. 16, 1995, by Francis M. S. Ho, et al. (the subject matter of which is incorporated herein by reference) and U.S. Pat. No. 5,446,366 entitled "BOOST CONVERTER POWER SUPPLY WITH REDUCED LOSSES, CONTROL CIRCUIT AND METHOD THEREFOR", issued Aug. 29, 1995, by John A. Bassett, et al. (the subject matter of which is incorporated herein by reference).

FIG. 1 is a simplified circuit diagram of an AC-to-DC power converter 1 designed to have low input current harmonics. AC-to-DC power converter 1 includes input terminals 2, a rectifier bridge 3, a power switch 4, a storage capacitor 5, one magnetic component 6 (having a first primary winding 6A, a second primary winding 6B and a secondary winding 6C), power diodes 7, 8, 9, an output rectifier circuit 10, a control circuit 11, and output terminals 12.

First, although such AC-to-DC power converters operate satisfactorily for many applications, it is desirable to reduce the number of circuit components in order to reduce cost. Second, although the input current harmonics of the AC-to-DC power converter of FIG. 1 are relatively low, it is nevertheless desirable to reduce such input current harmonics further. FIG. 2 is a waveform diagram illustrating the input voltage and input current waveforms of the AC-to-DC converter of FIG. 1. The sharp current spikes of the input current waveform represent undesirable high frequency input current components.

Accordingly, an AC-to-DC power converter is desired which has improved input current harmonics and which also has fewer circuit components.

SUMMARY

An AC-to-DC power converter in accordance with the invention draws input current through an inductor. When the input voltage of the converter is sufficiently high and the switch of the converter is on, current flows into the converter, through the inductor, to the tap of a transformer, through a first primary winding of a transformer, and through the switch. When the switch is then turned off, current continues to flow through the inductor and to the tap of the transformer but then flows through a second primary of the transformer and into a storage capacitor. Energy stored in the storage capacitor is transferred to the load when it is not possible to obtain sufficient energy from the input current to supply the load. The AC-to-DC converter has very few circuit components and low input current harmonics.

This summary does not purport to define the invention. The invention is defined by the claims.

DETAILED DESCRIPTION OF THE PREFERRED EMBODIMENTS

Figure 3:
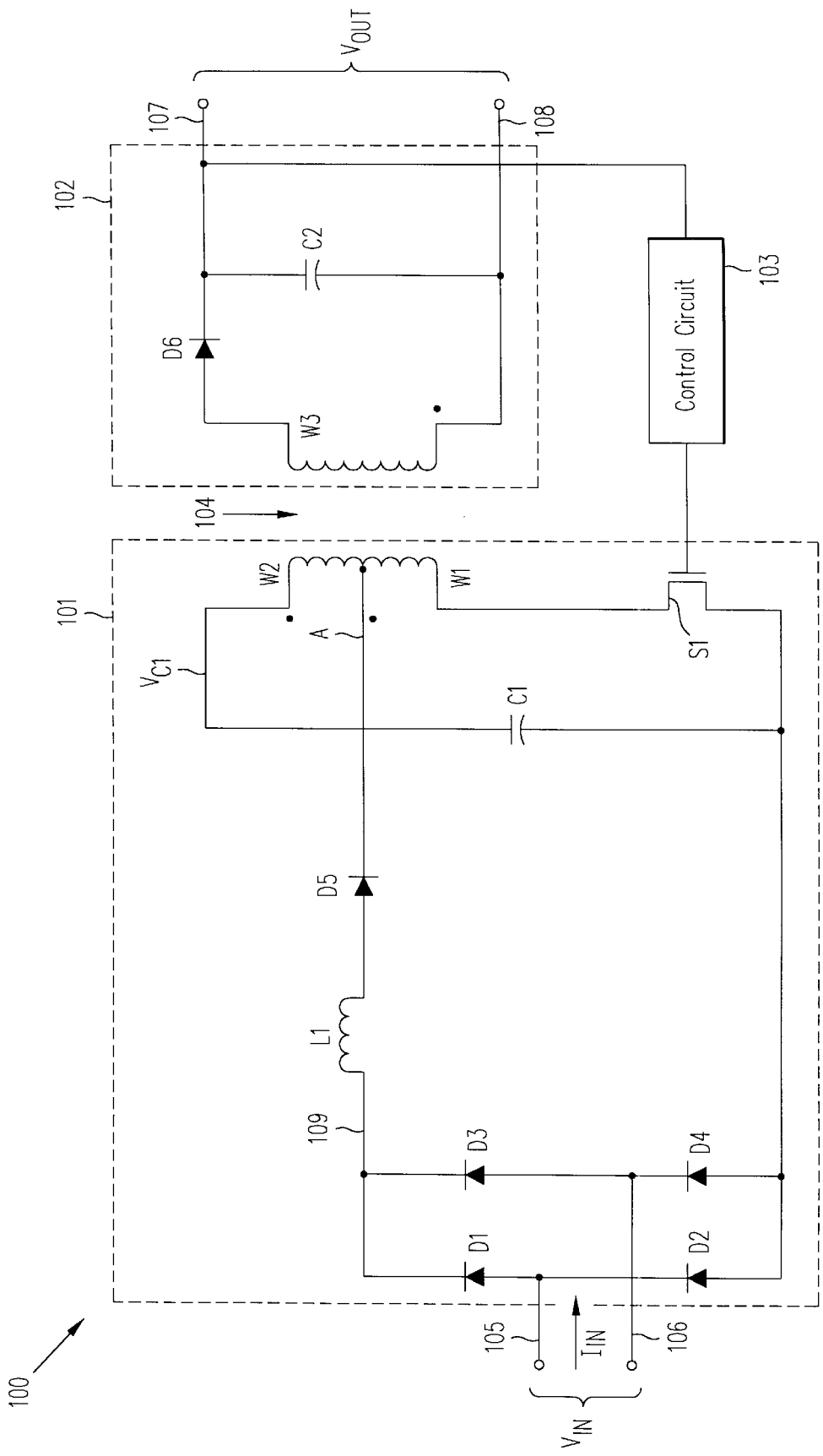
FIG. 3 is a simplified circuit diagram of an AC-to-DC power converter designed to have low input current harmonics in accordance with an embodiment of the present invention.

FIG. 3 is a simplified diagram of an AC-to-DC power converter 100 which includes a primary circuit 101, a secondary circuit 102, and a control circuit 103. A transformer 104, which is split between the primary circuit and the secondary circuit, includes a first primary winding W1, a second primary winding W2, and a secondary winding W3. The power converter also includes input terminals 105 and 106, a rectifier bridge consisting of power diodes D1, D2, D3 and D4, an inductor L1, a power diode D5, a storage capacitor C1, a power switch S1, an output rectifier circuit consisting of power diode D6 and capacitor C2, and output terminals 107 and 108. Inductor L1 is not magnetically coupled with transformer 104. The control circuit 103 controls the switch S1 to turn on and off at a rapid rate (for example, 75 KHz), the on/off duty cycle being controlled to maintain and regulate the desired output voltage $V_{OUT}$ on output terminals 107 and 108. The control circuit may pulse-width modulate the on/off times of the switch to achieve the desired regulation. Other techniques of controlling switch S1 may also be used.

The AC-to-DC power converter 100 has very few circuit components. The converter has: 1) no more than one power diode other than the power diodes in the rectifier bridge, the output rectifier circuit and the switch, 2) only one switch, and 3) only one control circuit.

Figure 1:
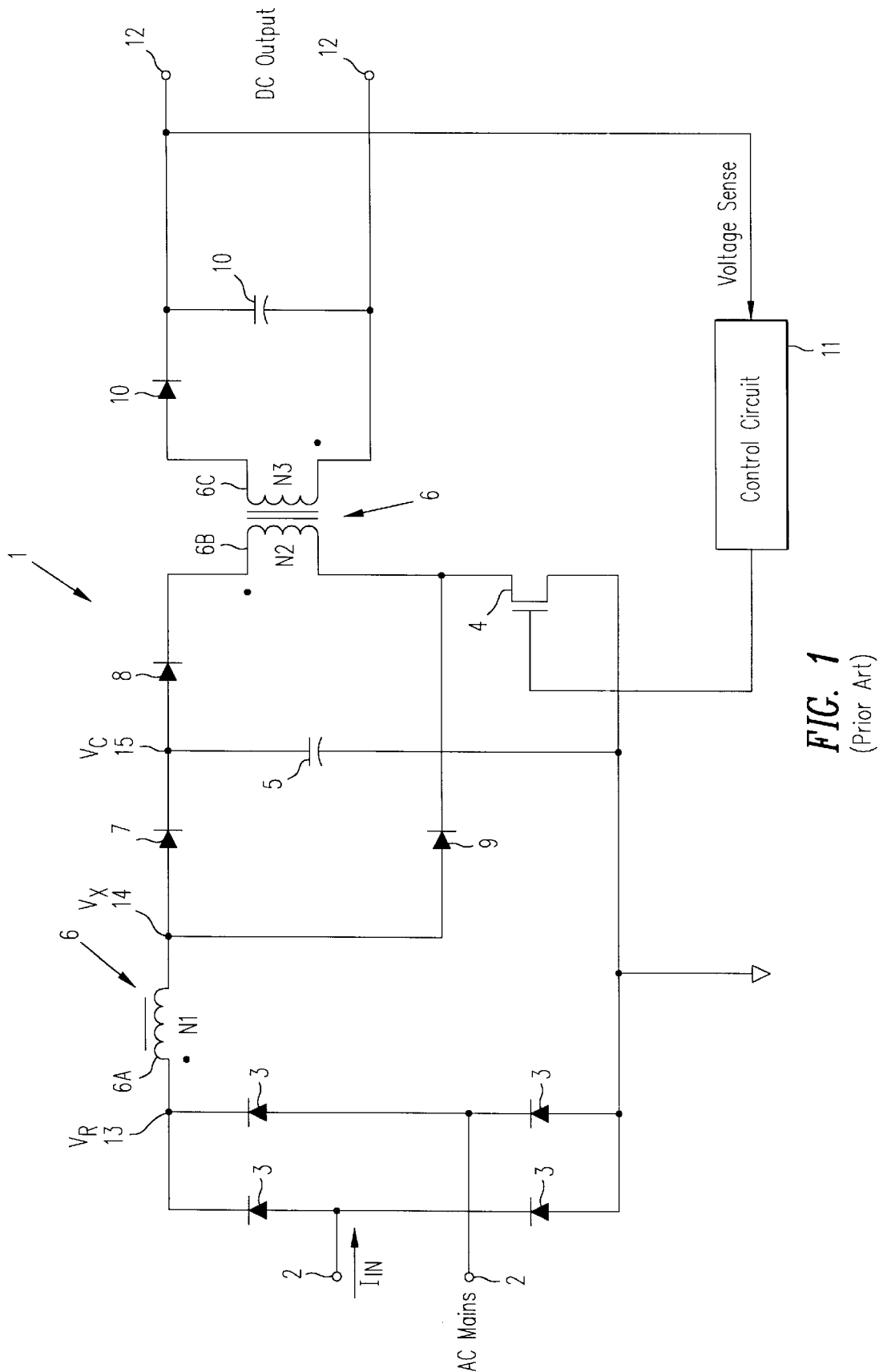
FIG. 1 is a simplified circuit diagram of an AC-to-DC power converter designed to have low input current harmonics.
Figure 2:
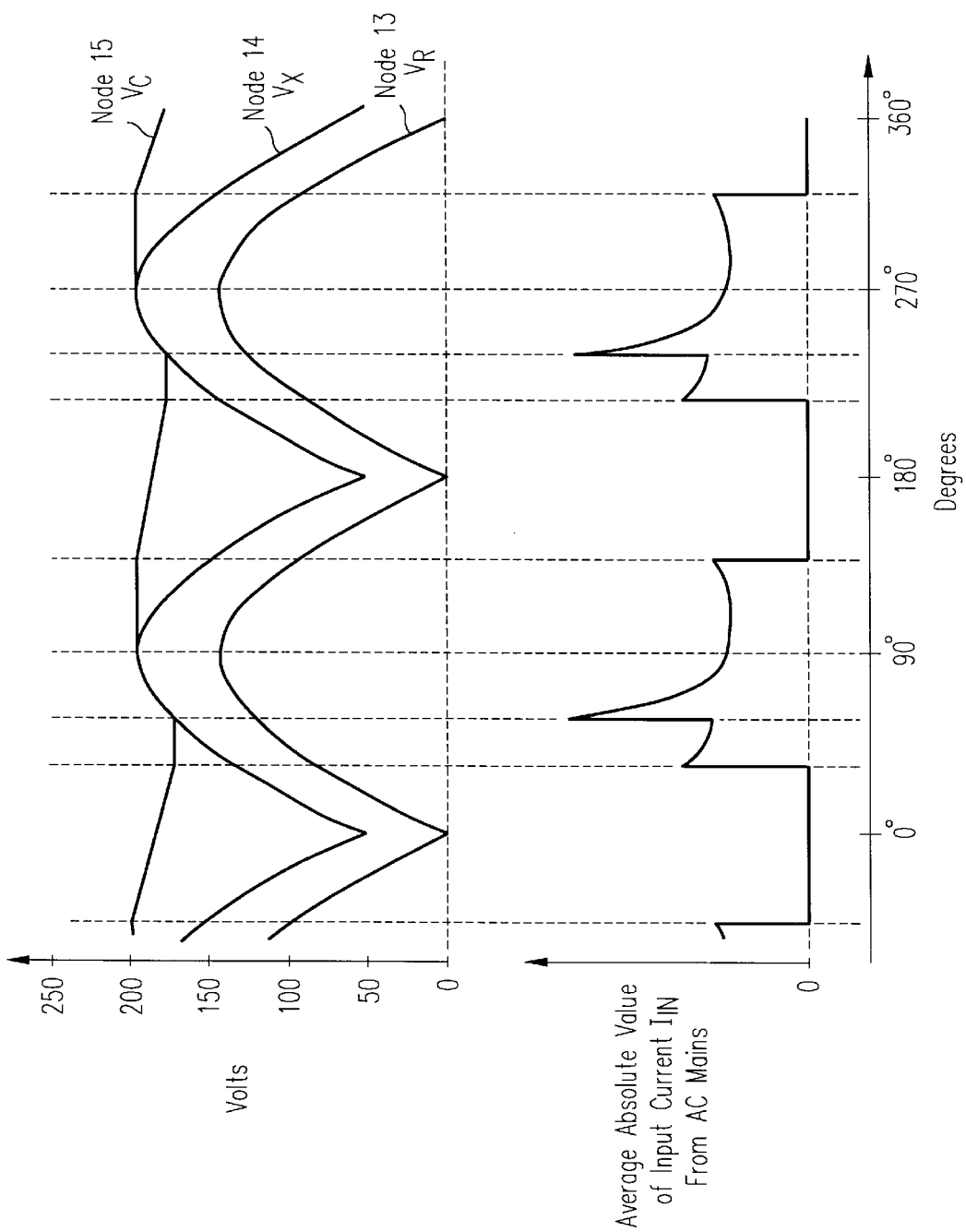
FIG. 2 is a waveform diagram illustrating the input voltage and input current waveforms of the AC-to-DC power converter of FIG. 1.
Figure 4:
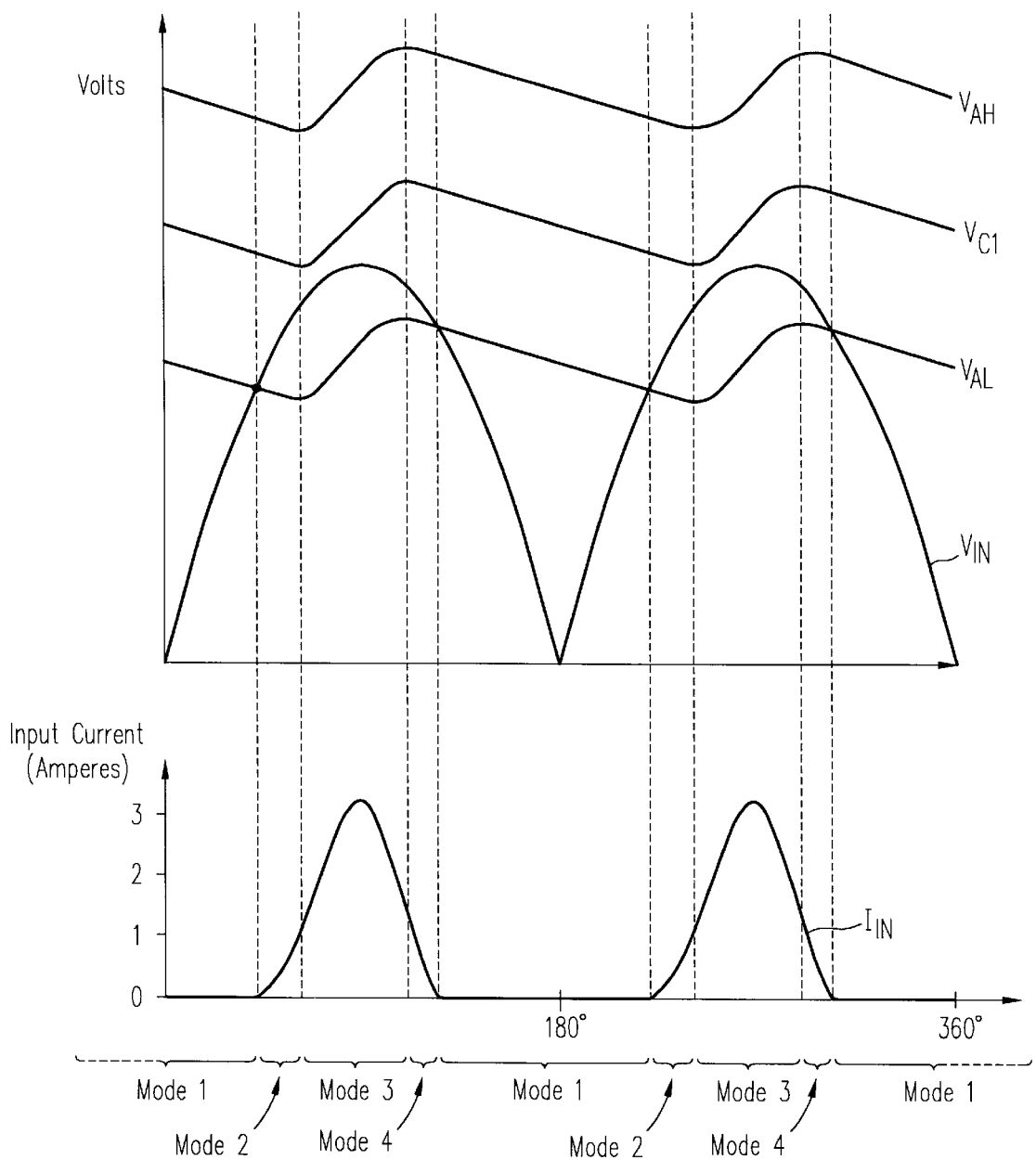
FIG. 4 is a waveform diagram illustrating the input voltage and input current waveforms of the AC-to-DC power converter of FIG. 3.

FIG. 4 is a waveform diagram illustrating the input voltage and input current waveforms of the AC-to-DC power converter of FIG. 3. The circuit of FIG. 3 has four modes of operation as indicated by the labeling of the bottom axis of FIG. 4. The input voltage waveform labeled $V_{IN}$ in FIG. 3 represents the rectified value of the 50 Hz A.C. input voltage on input terminals 105 and 106 (this is also the voltage at node 109). The voltage waveform labeled $V_{C1}$ in FIG. 4 represents the voltage on capacitor C1 of FIG. 3. The voltage waveform (voltage envelope) labeled $V_{AH}$ in FIG. 3 represents the voltage on node A in FIG. 3 when the switch S1 is off and the voltage waveform (voltage envelope) labeled $V_{AL}$ in FIG. 3 represents the voltage on node A when the switch is on. The waveform labeled $I_{IN}$ in FIG. 4 represents the rectified value of the input current flowing into the AC-to-DC power converter 100 of FIG. 3 via input terminals 105 and 106 (this is also the current flowing into the power converter through node 109). Note that the input current waveform $I_{IN}$ in FIG. 4 does not have the sharp spikes as seen in the input current waveform of FIG. 2. This indicates a lower high frequency input current harmonic content.

$V_{AL}$ is given by:

$$V_{AL} = V_{C1} \frac{W1}{W1 + W2} \quad \text{(equ. 1)}$$

$V_{AH}$ is given by:

$$V_{AH} = V_{C1} + V_{out} \frac{W2}{W3} \quad \text{(equ. 2)}$$

Operation of the power converter 100 is described in connection with four operating modes. Switch S1 is switched on and off many times in each operating mode. In mode one, energy does not flow into power converter 100. Energy previously stored in storage capacitor C1 is used to supply the output load (not shown) coupled to the output terminals. In mode two, there is only a small voltage across inductor L1 and the amount of energy which is drawn from the input terminals is not adequate to supply the load. Thus, energy is supplied to the output terminals from both current flowing into the input terminals as well as from energy previously stored in the storage capacitor. The voltage on the storage capacitor therefore decreases throughout mode 2 as seen in FIG. 4. In mode three, the energy drawn through the input terminals exceeds the amount of energy supplied to the output terminals due to the increasing voltage across inductor L1. This excess energy is stored in storage capacitor C1 thereby increasing the voltage on storage capacitor C1 through mode 3 as seen in FIG. 4. In mode four, the falling magnitude of the input voltage reduces the voltage across inductor L1 such that the amount of energy received from the input terminals is less than the amount of energy needed by the load. Hence, energy for the load comes from both input current flow as well as from storage capacitor C1. The voltage on the storage capacitor C1 decreases through mode 4 as seen in FIG. 4.

Figure 5A:
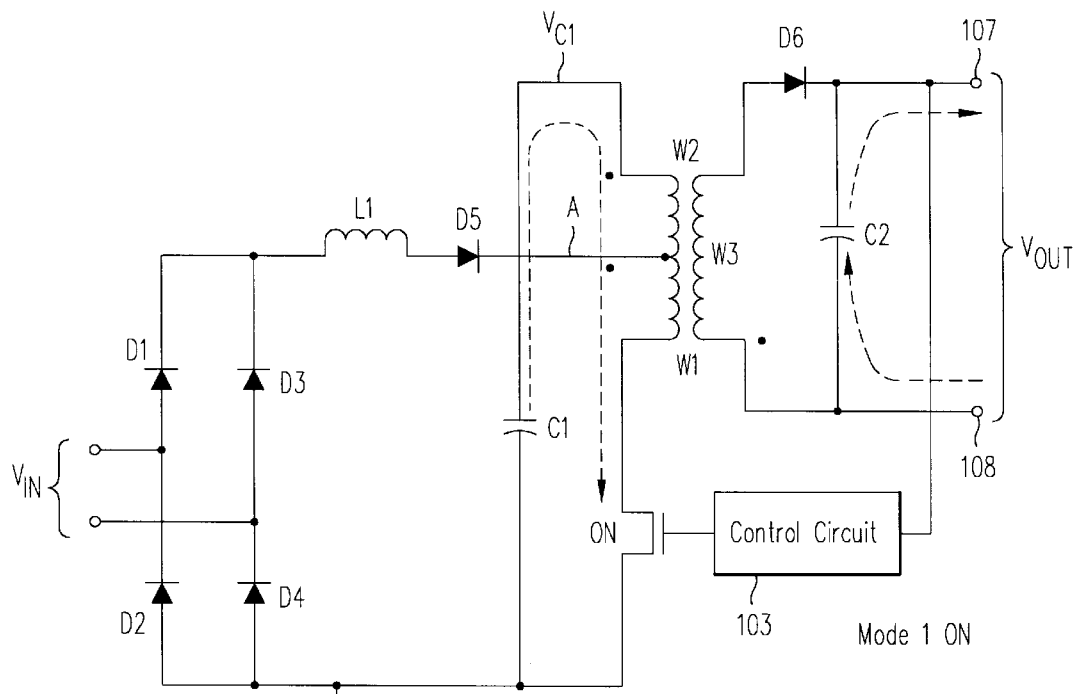
FIGS. 5A–5D are simplified circuit diagrams which illustrate operation of the AC-to-DC power converter of FIG. 3.
Figure 5B:
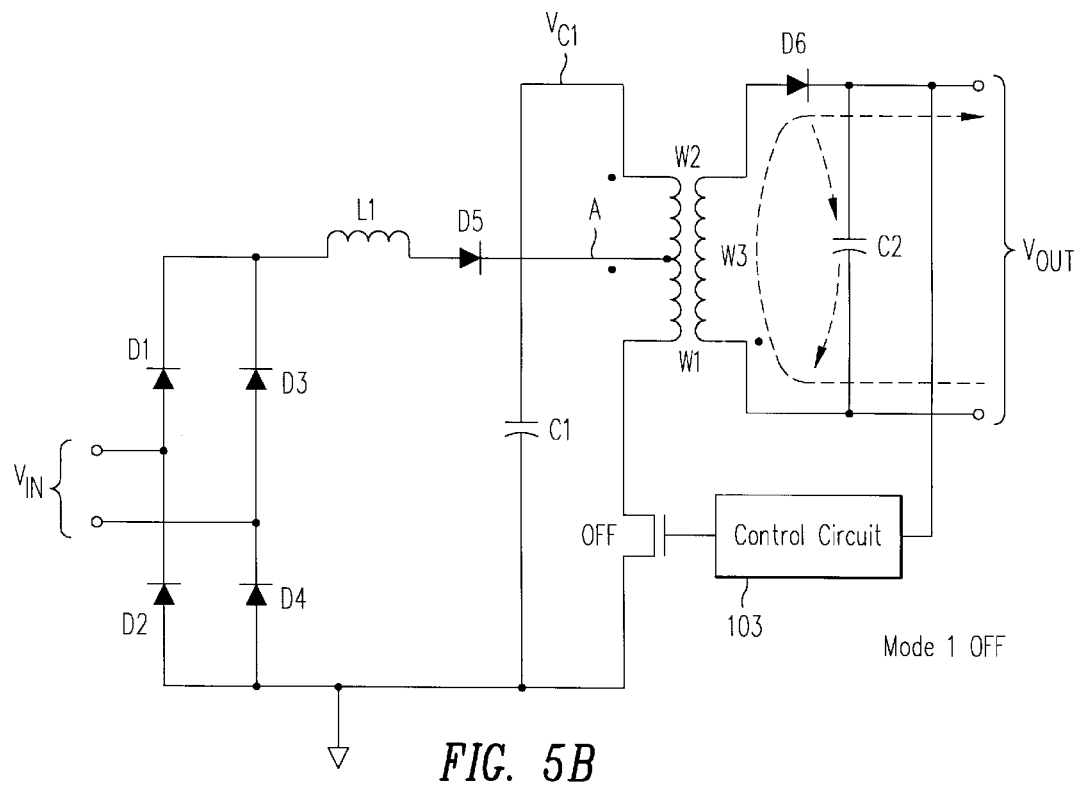

FIGS. 5A and 5B illustrate operation of the AC-to-DC power converter in mode 1 (see the "mode 1" label for the bottom axis of FIG. 4) before the voltage $V_{IN}$ rises above $V_{AL}$. In mode 1, all energy supplied to the output terminals is supplied from the storage capacitor C1. No energy is flowing into the power converter via the input terminals.

FIG. 5A illustrates current flow in mode 1 when the switch S1 is on. Current flows from capacitor C1, through second primary winding W2, through first primary winding W1, and through switch S1 to ground. (It is understood that the source of switch S1 need not actually be "grounded". The triangle symbol in FIG. 5A is provided as a reference to simplify the explanation of how the circuit works.) Capacitor C2 supplies energy to the load (not shown) coupled to the output terminals 107 and 108.

FIG. 5B illustrates current flow in mode 1 when the switch S1 is off. Energy stored in the first and second primary windings W1 and W2 is transferred to the secondary winding W3 and is in turn transferred through power diode D6 to capacitor C2. Energy needed by the load (not shown) is also supplied by the current from the secondary winding W3 as shown in FIG. 5B. Mode 1 terminates when the voltage $V_{IN}$ rises above voltage $V_{AL}$ (see FIG. 4) and the power converter starts to draw energy through the input terminals.

Figure 5C:
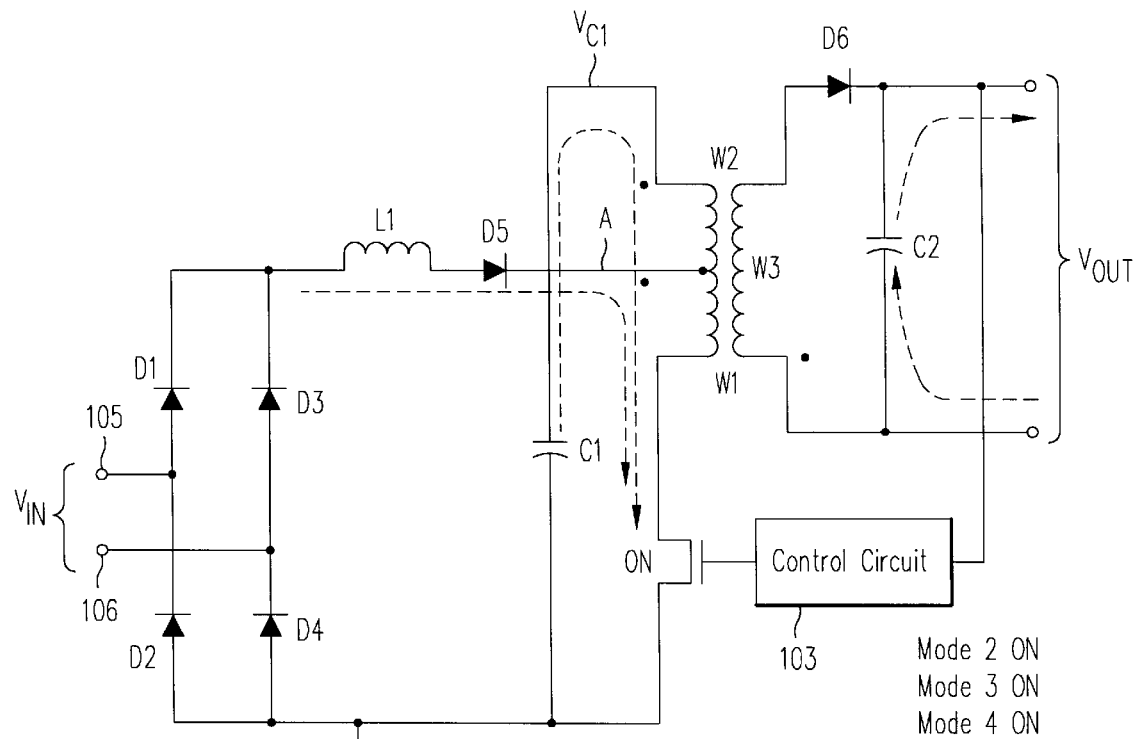
Figure 5D:
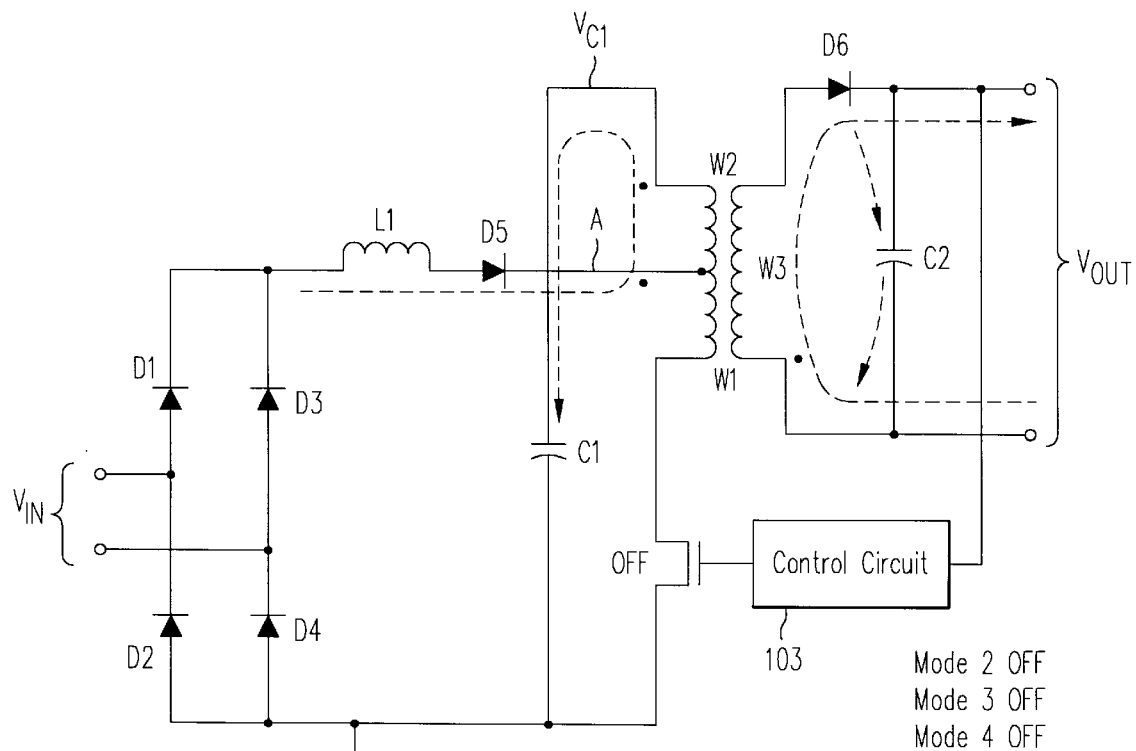

FIGS. 5C and 5D illustrate current flow in mode 2 (see the "mode 2" label for the bottom axis of FIG. 4) when some energy for the output is being supplied through the input terminals but the voltage on the storage capacitor C1 is nonetheless falling because more energy is being taken out of the storage capacitor than is being resupplied.

FIG. 5C illustrates current flow in mode 2 when switch S1 is on. Because $V_{IN}$ is greater than $V_{AL}$ when switch S1 is on, a current flows from the input terminals 105 and 106, through the rectifier bridge, through inductor L1, through power diode D5, through first primary winding W1, and through switch S1 to ground as illustrated. Passing the input current through inductor L1 provides for a smooth input current waveform. This current is, however, small. Accordingly, another current flows from storage capacitor C1, through second primary winding W2, through first primary winding W1 and through switch S1 to ground as illustrated. Previously charged capacitor C2 supplies energy to the load (not shown).

FIG. 5D illustrates current flow in mode 2 when switch S1 is off. Current flow through inductor L1 is redirected due to switch S1 being off such that current flows in the reverse direction through second primary winding W2 and into capacitor C1, thereby replacing some of the energy that was taken out of the capacitor when the switch was on. Energy is transferred from the second primary winding W2 to the secondary winding W3 such that a current flows through the secondary winding W3. This current flow through the secondary winding W3 both charges capacitor C2 and supplies the load with the needed energy. Mode 2 terminates when the input voltage has increased to the point that the energy being drawn through the input terminals exceeds the amount of energy supplied to the output terminals.

In mode 3, the energy drawn through the input terminals exceeds the amount of energy supplied to the output terminals. This excess energy is stored in the storage capacitor C1 such that the voltage on the storage capacitor C1 increases in mode 3 as seen by voltage waveform $V_{C1}$ in FIG. 4. FIGS. 5C and 5D illustrate current flow in mode 3 when the switch S1 is on and off, respectively.

In mode 4, the falling magnitude of the input voltage reduces the voltage across inductor L1 such that the amount of energy received from the input terminals is less than the amount of energy supplied to the load. Hence, the voltage on the storage capacitor C1 decreases in mode 4 as seen by voltage waveform $V_{C1}$ in FIG. 4. FIGS. 5C and 5D illustrate current flow in mode 4 when the switch S1 is on and off, respectively.

Table 1 below sets forth component values in accordance with one specific embodiment wherein $V_{IN}$ is 230 volts A.C.

R.M.S. at 50 Hz, $V_{OUT}$ is 5.0 volts D.C., wherein control circuit 103 is a Unitrode UC3843 integrated circuit (pin 2 is the input and pin 6 is the output), and wherein the conduction angle is about 89 degrees out of 180 degrees.

TABLE 1

| COMPONENT | VALUE, TYPE |
|---|---|
| L1 | 40 μH, toroidal |
| W1 | 34 turns, ferrite E-core |
| W2 | 14 turns, ferrite E-core |
| W3 | 3 turns, ferrite E-core |
| C1 | 220 μF, electrolytic |
| C2 | 6000 μF, electrolytic |
| D1, D2, D3, D4 | 1N4007 |
| D5 | BYV36C |
| D6 | MBR1645 |

Figure 6:
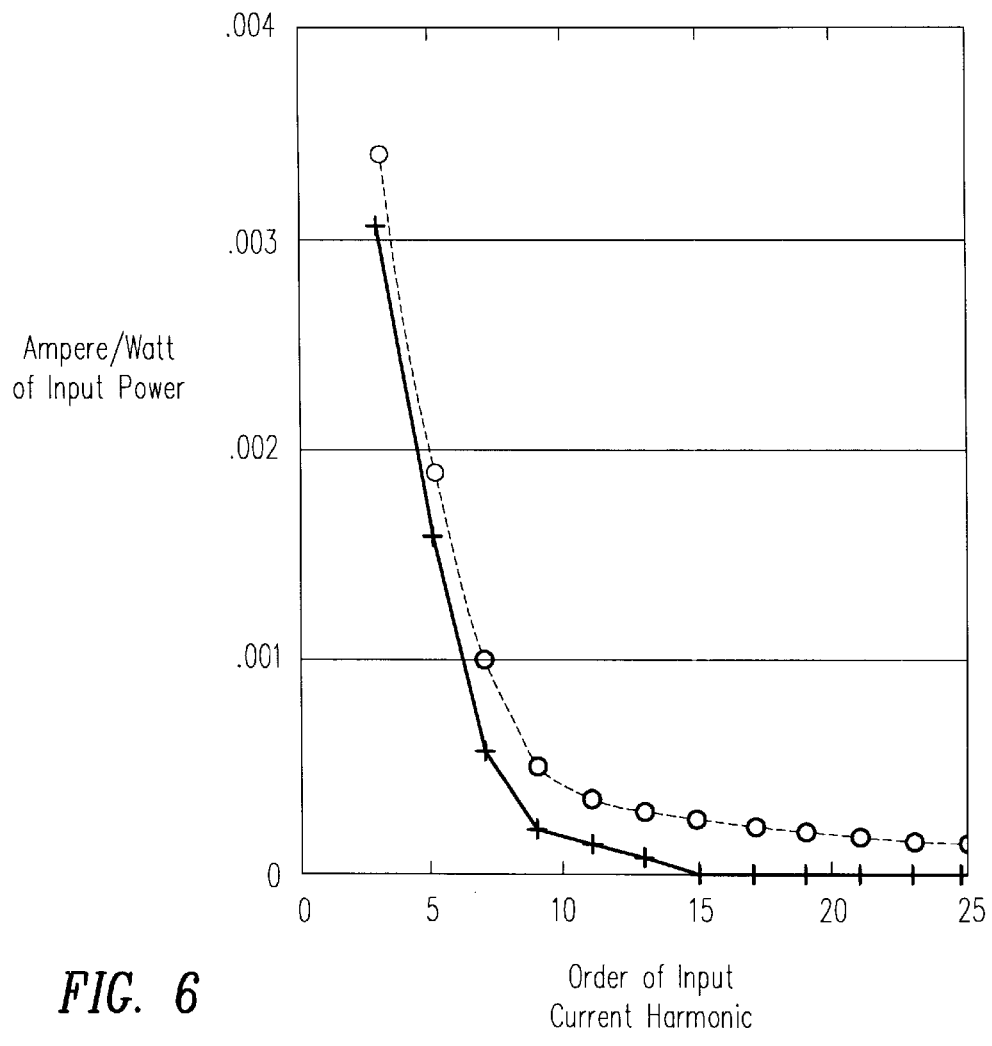
FIG. 6 is a graph which illustrates how the input current harmonics of the AC-to-DC power converter of FIG. 3 satisfy the International Electrotechnical Commission 1000-3-2 Standard for odd input current harmonics for a class D 150 watt AC-to-DC power converter.

FIG. 6 is a graph illustrating the odd harmonic components (as simulated on MathCad) of the input current flowing into the specific embodiment having component values set forth in Table 1. The dashed line in FIG. 6 represents the maximum permissible odd input current harmonic content allowed by the International Electrotechnical Commission 1000-3-2 Standard for a class D 150 watt AC-to-DC power converter. The simulated magnitudes of the odd input current harmonics are also set forth in Table 2 below.

TABLE 2

| HARMONIC OF FUNDAMENTAL OF INPUT CURRENT | AMPERES OF INPUT CURRENT PER WATT OF INPUT POWER | AMPERES OF INPUT CURRENT PER WATT ALLOWED PER I.E.C. STANDARD |
|---|---|---|
| 3 | $3.07 \times 10^{-3}$ | $3.4 \times 10^{-3}$ |
| 5 | $1.59 \times 10^{-3}$ | $1.9 \times 10^{-3}$ |
| 7 | $5.85 \times 10^{-4}$ | $1.0 \times 10^{-3}$ |
| 9 | $2.16 \times 10^{-4}$ | $0.50 \times 10^{-3}$ |
| 11 | $1.53 \times 10^{-4}$ | $0.35 \times 10^{-3}$ |
| 13 | $9.35 \times 10^{-5}$ | $0.29 \times 10^{-3}$ |
| 15 | $1.39 \times 10^{-5}$ | $0.25 \times 10^{-3}$ |
| 17 | $7.50 \times 10^{-6}$ | $0.22 \times 10^{-3}$ |
| 19 | $1.41 \times 10^{-5}$ | $0.20 \times 10^{-3}$ |
| 21 | $1.93 \times 10^{-5}$ | $0.18 \times 10^{-3}$ |
| 23 | $2.56 \times 10^{-6}$ | $0.16 \times 10^{-3}$ |
| 25 | $9.18 \times 10^{-6}$ | $0.15 \times 10^{-3}$ |

The inductance of inductor L1 and number of turns of primaries W1 and W2 can be chosen to vary the magnitudes of the input current harmonics and the conduction angle (the number of degrees through which the power converter draws input current). Values of L1, W1 and W2 are chosen, the circuit is simulated (for example, on SPICE or MathCad), the magnitudes of the input current harmonics are determined, other values of L1, W1 and W2 are chosen, and the process is repeated. The conduction angle of the converter can be adjusted by changing the W1/W2 winding ratio of the transformer. Reducing the conduction angle may result in lower storage capacitor voltages and therefore allow a smaller storage capacitor to be used.

Figure 7:
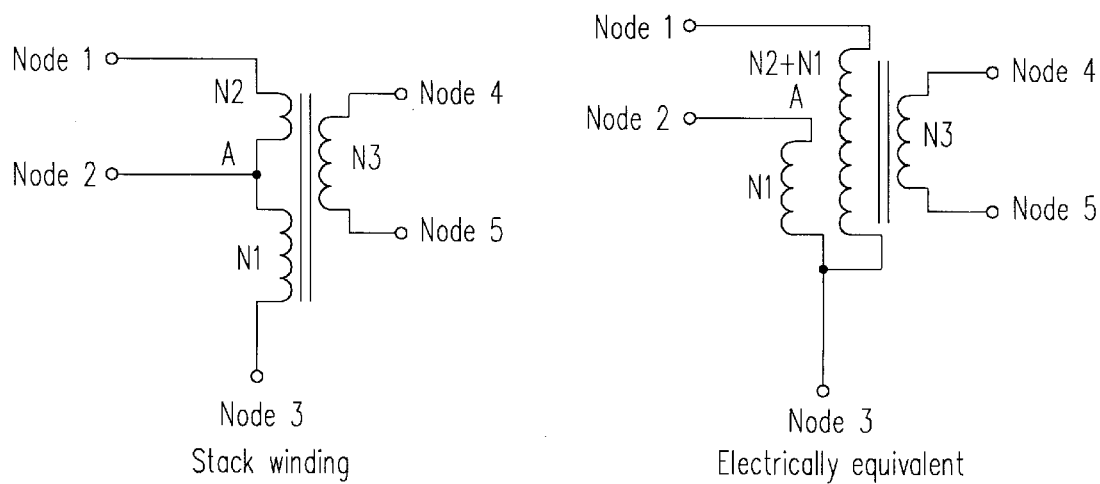
FIG. 7 illustrates two electrically equivalent transformer structures.

In some embodiments, power diode D5 is omitted. Power diode D5 (a relatively fast diode) acts to prevent the flow of current from node A back through inductor L1 and to the input terminals. If such fast response is not necessary, power diode D5 can be omitted and the relatively slow power diodes D1 and D3 of the rectifier bridge can be relied upon to cut off current flow back to the input terminals. It is also possible to replace the stacked winding configuration of the transformer of FIG. 3 with an electrically equivalent structure. FIG. 7 illustrates these two electrically equivalent structures.

In one embodiment, the power converter operates in a "discontinuous mode" whereby the current flowing in the inductor L1 returns to zero before the end of each switch S1 on/off switching cycle. In other embodiments, the power converter operates in the "continuous" mode. In other embodiments, the power converter moves back and forth from "continuous" to "discontinuous" operation over the course of the AC input voltage waveform.

Although the present invention is illustrated in connection with certain specific embodiments for instructional purposes, the present invention is not limited thereto. Additional circuit components can be added to achieve additional functions including electromagnetic interference filtering. Additional output secondary windings and associated output rectifier circuits can be added to provide other output voltages on other output terminals. The order of circuit components connected in series can be reversed in some embodiments. Accordingly, various adaptations, modifications and combinations of the features of the specific embodiments can be practiced without departing from the scope of the invention as set forth in the following claims.

What is claimed is:

1. An AC-to-DC power converter having an AC input current terminal, comprising:
    an inductor;
    a transformer having a first primary winding, a second primary winding and a secondary winding;
    a power switch;
    a storage capacitor; and
    means for controlling the power switch such that a current flows from the AC input current terminal, through the inductor and through the first primary winding to the switch when the switch is on, and such that a current flows from the AC input current terminal, through the inductor, through the second primary winding and into the capacitor when the switch is off, and such that no current flows from the AC input current terminal into the transformer without first flowing through the inductor.

2. The AC-to-DC power converter of claim 1, wherein the first primary winding has a first terminal and a second terminal and wherein the second primary winding has a first terminal and a second terminal, the first terminal of the first primary winding is coupled to the second terminal of the second primary winding.

3. The AC-to-DC power converter of claim 2, wherein the inductor has a first terminal and a second terminal, further comprising:
    a diode having a first terminal and a second terminal, the first terminal of the diode being coupled to the second terminal of the inductor, the second terminal of the diode being coupled to the first terminal of the first primary winding.

4. The AC-to-DC power converter of claim 1, wherein the secondary winding has a first terminal and a second terminal, further comprising:
    an output rectifier circuit coupled to the first and second terminals of the secondary winding.

5. The AC-to-DC power converter of claim 1, wherein the storage capacitor has a first terminal and a second terminal, wherein the second primary winding has a first terminal and a second terminal, and wherein the power switch has a first terminal, a second terminal and a third terminal, the first terminal of the storage capacitor being coupled to the first terminal of the second primary winding, the second terminal of the storage capacitor being coupled to the second terminal of the power switch.

6. The AC-to-DC power converter of claim 5, wherein the first primary winding has a first terminal and a second terminal, wherein the first terminal of the power switch is coupled to the second terminal of the first primary winding, the first terminal of the first primary winding being coupled to the second terminal of the second primary winding.

7. The AC-to-DC power converter of claim 6, wherein the third terminal of the power switch is coupled to an output terminal of the means for controlling.

8. The AC-to-DC power converter of claim 6, wherein the inductor is not magnetically coupled to any winding of the transformer.

9. The AC-to-DC power converter of claim 2, wherein the inductor has a first terminal and a second terminal, the second terminal of the inductor is connected directly to the first terminal of the first primary winding, further comprising:

a rectifier bridge coupled to the AC input current terminal, the rectifier bridge coupled to the first terminal of the inductor; and an output rectifier circuit coupled to the secondary winding of the transformer;

wherein the AC-to-DC power converter comprises no power diodes between the rectifier bridge and the transformer through which current from the AC input terminals flows.

10. An AC-to-DC power converter, comprising:

AC input terminals;

DC output terminals; and means for converting an AC input current flowing through the AC input terminals in to a DC output voltage supplied onto the DC output terminals, the means comprising:

a rectifier bridge coupled to the AC input terminals;

a transformer having a first primary winding, a second primary winding and a secondary winding;

a switch; and an output rectifier circuit coupled to the secondary winding of the transformer and to the DC output terminals, wherein the current path from the rectifier bridge to the transformer comprises an inductor and no more than one power diode through which current flows, and wherein the means comprises no more than one current path from the rectifier bridge to the transformer;

wherein the AC input current has less than the amperes of input current set forth in the table below per watt of input power for each of the listed harmonics of the fundamental of the AC input current:

TABLE

| HARMONIC OF FUNDAMENTAL OF INPUT CURRENT | AMPERES OF INPUT CURRENT PER WATT OF INPUT POWER |
|---|---|
| 3 | $3.4 \times 10^{-3}$ |
| 5 | $1.9 \times 10^{-3}$ |
| 7 | $1.0 \times 10^{-3}$ |
| 9 | $0.50 \times 10^{-3}$ |
| 11 | $0.35 \times 10^{-3}$ |
| 13 | $0.29 \times 10^{-3}$ |
| 15 | $0.25 \times 10^{-3}$ |
| 17 | $0.22 \times 10^{-3}$ |
| 19 | $0.20 \times 10^{-3}$ |
| 21 | $0.18 \times 10^{-3}$ |
| 23 | $0.16 \times 10^{-3}$ |
| 25 | $0.15 \times 10^{-3}$. |

11. An AC-to-DC power converter comprising;

AC input terminals;

DC output terminals; and means for converting an AC input current flowing through the AC input terminals in to a DC output voltage supplied onto the DC output terminals, the means comprising:

a rectifier bridge coupled to the AC input terminals;

a transformer having a first primary winding, a second primary winding and a secondary winding;

a switch; and an output rectifier circuit coupled to the secondary winding of the transformer and to the DC output terminals, wherein the current path from the rectifier bridge to the transformer comprises an inductor and no more than one power diode through which current flows, and wherein the means comprises no more than one current path from the rectifier bridge to the transformer;

wherein the AC-to-DC power converter satisfies the International Electrotechnical Commission 1000-3-2 Standard for odd input current harmonics for a 150 watt class D AC-to-DC power converter; and wherein the AC input current has less than the amperes of input current set forth in the table below per watt of input power for each of the listed harmonics of the fundamental of the AC input current:

TABLE

| HARMONIC OF FUNDAMENTAL OF INPUT CURRENT | AMPERES OF INPUT CURRENT PER WATT OF INPUT POWER |
|---|---|
| 3 | $3.4 \times 10^{-3}$ |
| 5 | $1.9 \times 10^{-3}$ |
| 7 | $1.0 \times 10^{-3}$ |
| 9 | $0.50 \times 10^{-3}$ |
| 11 | $0.35 \times 10^{-3}$ |
| 13 | $0.29 \times 10^{-3}$ |
| 15 | $0.25 \times 10^{-3}$ |
| 17 | $0.22 \times 10^{-3}$ |
| 19 | $0.20 \times 10^{-3}$ |
| 21 | $0.18 \times 10^{-3}$ |
| 23 | $0.16 \times 10^{-3}$ |
| 25 | $0.15 \times 10^{-3}$. |

12. An AC-to-DC power converter, comprising:

a rectifier bridge having a first input terminal, a second input terminal, a first output terminal and a second output terminal;

an inductor having a first terminal and a second terminal, the first terminal coupled to the first output terminal of the rectifier bridge;

a transformer having a first primary winding, a second primary winding and a secondary winding, the first primary winding having a first terminal and a second terminal, the second primary winding having a first terminal and a second terminal, the secondary winding having a first terminal and a second terminal, the second terminal of the second primary winding being coupled to the first terminal of the first primary winding, the second terminal of the inductor being coupled to the first terminal of the first primary winding;

a power switch having a first terminal, a second terminal and a third terminal, the first terminal of the power switch being coupled to the second terminal of the first primary winding;

a capacitor having a first terminal and a second terminal, the first terminal of the capacitor being coupled to the first terminal of the second primary winding, the first terminal of the capacitor not being coupled to the first output terminal of the rectifier bridge, the second terminal of the capacitor being coupled to the second terminal of the power switch and also being coupled to the second output terminal of the rectifier bridge;

an output rectifier circuit coupled to the first and second terminals of the secondary winding of the transformer; and a control circuit having an input terminal and an output terminal, the input terminal of the control circuit being coupled to a terminal of the output rectifier circuit, the output terminal of the control circuit being coupled to the third terminal of the power switch.

13. The AC-to-DC power converter of claim 12, wherein the second terminal of the inductor is coupled to the first terminal of the first primary winding by a diode.

14. The AC-to-DC power converter of claim 12, wherein the AC-to-DC power converter comprises no power diodes between the rectifier bridge and the transformer.

15. A method, comprising:

turning a switch of an AC-to-DC power converter on such that input current flows into the AC-to-DC power converter through an input, through an inductor, to a tap of a transformer, through a first primary of the transformer, and through the switch;

turning the switch off such that input current flows into the AC-to-DC power converter through the input, through the inductor, to the tap of the transformer, through a second primary of the transformer, and into a storage capacitor;

transferring first energy from the storage capacitor to an output of the AC-to-DC power converter when more energy is being output from the converter than is being received through the input; and transferring second energy from the input to the output via the transformer, without storing the second energy in any capacitor of the converter, when less energy is being output from the AC-to-DC power converter than is being received through the input, wherein no energy is transferred from the input to the output without first flowing through the inductor.

16. The method of claim 15, wherein a power diode is disposed between the inductor and the tap of the transformer.

17. The method of claim 15, wherein no power diode is disposed between the inductor and the tap of the transformer.

18. The method of claim 15, wherein the AC-to-DC power converter has only one switch through which input current flows.

* * * * *